United States Patent
Kodosky

(10) Patent No.: US 7,134,086 B2
(45) Date of Patent: Nov. 7, 2006

(54) SYSTEM AND METHOD FOR ASSOCIATING A BLOCK DIAGRAM WITH A USER INTERFACE ELEMENT

(75) Inventor: Jeffrey L. Kodosky, Austin, TX (US)

(73) Assignee: National Instruments Corporation, Austin, TX (US)

(*) Notice: Subject to any disclaimer, the term of this patent is extended or adjusted under 35 U.S.C. 154(b) by 598 days.

(21) Appl. No.: 10/072,323

(22) Filed: Oct. 23, 2001

(65) Prior Publication Data

US 2003/0076355 A1 Apr. 24, 2003

(51) Int. Cl.
- G06F 3/00 (2006.01)
- G06F 9/06 (2006.01)
- G06F 17/00 (2006.01)

(52) U.S. Cl. ............... 715/763; 715/762; 715/967; 715/866; 715/771; 717/109; 717/113

(58) Field of Classification Search ............... 345/763, 345/764, 765, 767, 771, 772, 773, 853, 967; 717/110, 113, 105, 109, 121, 100, 106, 107, 717/108, 116, 120; 715/763–765, 767, 771–773, 715/853, 967, 866

See application file for complete search history.

(56) References Cited

U.S. PATENT DOCUMENTS

| | | | |
|---|---|---|---|
| 4,901,221 A * | 2/1990 | Kodosky et al. ............ 715/771 |
| 4,914,568 A * | 4/1990 | Kodosky et al. ............ 715/763 |
| 5,291,587 A * | 3/1994 | Kodosky et al. ......... 715/967 X |
| 5,301,301 A * | 4/1994 | Kodosky et al. ............. 716/11 |
| 5,301,336 A * | 4/1994 | Kodosky et al. ............ 715/846 |
| 5,481,741 A * | 1/1996 | McKaskle et al. ...... 715/967 X |
| 5,920,479 A * | 7/1999 | Sojoodi et al. ............... 700/86 |
| 6,053,951 A * | 4/2000 | McDonald et al. ......... 717/109 |
| 6,138,270 A * | 10/2000 | Hsu ........................... 717/125 |
| 6,173,438 B1* | 1/2001 | Kodosky et al. ............ 717/109 |
| 6,219,628 B1* | 4/2001 | Kodosky et al. ............... 703/2 |
| 6,282,699 B1* | 8/2001 | Zhang et al. ............... 717/109 |
| 6,366,300 B1* | 4/2002 | Ohara et al. ................ 345/771 |
| 6,437,805 B1* | 8/2002 | Sojoodi et al. ............. 345/763 |
| 6,690,981 B1* | 2/2004 | Kawachi et al. ........ 715/762 X |
| 6,802,053 B1* | 10/2004 | Dye et al. ................... 717/113 |
| 2002/0083413 A1* | 6/2002 | Kodosky et al. ............ 717/109 |
| 2003/0071845 A1* | 4/2003 | King et al. ................. 345/764 |

* cited by examiner

*Primary Examiner*—Raymond J. Bayerl
(74) *Attorney, Agent, or Firm*—Meyertons Hood Kivlin Kowert & Goetzel, P.C.; Jeffrey C. Hood; Jason L. Burgess

(57) ABSTRACT

A system and method for associating a block diagram with a user interface element. A block diagram associated with a user interface element may include graphical code, i.e., a plurality of interconnected nodes, for controlling functionality of the user interface element. For example, when the user provides user input to a user interface control, a block diagram associated with the control may receive the user input and may respond to the user input. As another example, in response to a user interface indicator receiving data for display, a block diagram associated with the indicator may receive the data and process it, e.g., to control how the data is displayed.

27 Claims, 10 Drawing Sheets

SYSTEM AND METHOD FOR ASSOCIATING A BLOCK DIAGRAM WITH A USER INTERFACE ELEMENT

FILED OF THE INVENTION

The present invention relates to the field of graphical programming, and more particularly to a system and method for associating a graphical block diagram with a user interface element, such as a user interface control.

DESCRIPTION OF THE RELATED ART

Traditionally, high level text-based programming languages have been used by programmers in writing application programs. Many different high level programming languages exist, including BASIC, C, Java, FORTRAN, Pascal, COBOL, ADA, APL, etc. Programs written in these high level languages are translated to the machine language level by translators known as compilers or interpreters. The high level programming languages in this level, as well as the assembly language level, are referred to herein as text-based programming environments.

Increasingly, computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model or implement a process often is further complicated by the fact that a sequence of mathematical formulas, steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptualize a problem or process and then to program a computer to implement a solution to the problem or process. Since a user often is not fully proficient in techniques for programming a computer system in a text-based environment to implement his solution, the efficiency with which the computer system can be utilized often is reduced.

Examples of fields in which computer systems are employed to interact with physical systems are the fields of instrumentation, process control, industrial automation, and simulation. Computer measurement and control of devices such as instruments or industrial automation hardware has become increasingly desirable in view of the increasing complexity and variety of instruments and devices available for use. However, due to the wide variety of possible testing and control situations and environments, and also the wide array of instruments or devices available, it is often necessary for a user to develop a custom program to control a desired system.

As discussed above, computer programs used to control such systems traditionally had to be written in text-based programming languages such as, for example, assembly language, C, FORTRAN, BASIC, etc. Traditional users of these systems, however, often were not highly trained in programming techniques and, in addition, text-based programming languages were not sufficiently intuitive to allow users to use these languages without training. Therefore, implementation of such systems frequently required the involvement of a programmer to write software for control and analysis of instrumentation or industrial automation data. Thus, development and maintenance of the software elements in these systems often proved to be difficult.

U.S. Pat. Nos. 4,901,221; 4,914,568; 5,291,587; 5,301,301; and 5,301,336; among others, to Kodosky et al disclose a graphical system and method for modeling a process, i.e., a graphical programming environment which enables a user to easily and intuitively model a process. The graphical programming environment disclosed in Kodosky et al can be considered a higher and more intuitive way in which to interact with a computer. A graphically based programming environment can be represented at a level above text-based high level programming languages such as C, Basic, Java, etc.

The method disclosed in Kodosky et al allows a user to construct a diagram using a block diagram editor. The block diagram may include a plurality of interconnected icons such that the diagram created graphically displays a procedure or method for accomplishing a certain result, such as manipulating one or more input variables and/or producing one or more output variables. The diagram may have one or more of data flow, control flow and/or execution flow representations. In response to the user constructing a diagram or graphical program using the block diagram editor, data structures and/or program instructions may be automatically constructed which characterize an execution procedure that corresponds to the displayed procedure. The graphical program may be compiled or interpreted by a computer.

Therefore, Kodosky et al teaches a graphical programming environment wherein a user places or manipulates icons and interconnects or "wires up" the icons in a block diagram using a block diagram editor to create a graphical "program." A graphical program for performing an instrumentation, measurement or automation function, such as measuring a Unit Under Test (UUT) or device, controlling or modeling instruments, controlling or measuring a system or process, or for modeling or simulating devices, may be referred to as a virtual instrument (VI). Thus, a user can create a computer program solely by using a graphically based programming environment. This graphically based programming environment may be used for creating virtual instrumentation systems, modeling processes, control, simulation, and numerical analysis, as well as for any type of general programming.

A graphical program may have a graphical user interface. For example, in creating a graphical program, a user may create a front panel or user interface panel. The front panel may include various graphical user interface elements or front panel objects, such as user interface controls and/or indicators, that represent or display the respective input and output that will be used by the graphical program or VI, and may include other icons which represent devices being controlled. The front panel may be comprised in a single window of user interface elements, or may comprise a plurality of individual windows each having one or more user interface elements, wherein the individual windows may optionally be tiled together. When the controls and indicators are created in the front panel, corresponding icons or terminals may be automatically created in the block diagram by the block diagram editor. Alternatively, the user can place terminal icons in the block diagram which may cause the display of corresponding front panel objects in the front panel, either at edit time or later at run time. As another example, the front panel may comprise front panel objects, e.g., the GUI, embedded in the block diagram.

During creation of the block diagram portion of the graphical program, the user may select various function nodes or icons that accomplish his desired result and connect the function nodes together. For example, the function nodes may be connected in one or more of a data flow, control flow, and/or execution flow format. The function nodes may also be connected in a "signal flow" format, which is a subset of data flow. The function nodes may be connected between the terminals of the various user interface elements, e.g., between the respective controls and indicators. Thus the user may create or assemble a graphical program including a block diagram having a plurality of interconnected nodes graphically representing the desired process. The assembled graphical program may be represented in the memory of the computer system as data structures and/or program instructions. The assembled graphical program, i.e., these data structures, may then be compiled or interpreted to produce machine language that accomplishes the desired method or process as shown in the block diagram.

Input data to a graphical program may be received from any of various sources, such as from a device, unit under test, a process being measured or controlled, another computer program, or from a file. Also, a user may input data to a graphical program or virtual instrument using a graphical user interface, e.g., a front panel as described above. The input data may propagate through the data flow block diagram or graphical program and appear as changes on the output indicators. In an instrumentation application, the front panel can be analogized to the front panel of an instrument. In an industrial automation application the front panel can be analogized to the MMI (Man Machine Interface) of a device. The user may adjust the user interface controls on the front panel to affect the input and view the output on the respective indicators. Alternatively, the front panel may be used merely to view the input and output, or just the output, and the input may not be interactively manipulable by the user during program execution.

The front panel or user interface of a graphical program may include any of various types of user interface controls and other user interface elements. For example, the user interface may include various types of graphical buttons, list boxes, selection controls, numeric controls, menu bars, tool bars, etc. Also, a graphical programming environment may provide other types of specialized user interface elements, such as user interface elements that are useful for instrumentation or measurement applications. Examples of user interface elements useful for instrumentation applications include a thermometer indicator, an LED indicator, a meter indicator, a waveform graph indicator, a tank indicator, etc.

During execution of a graphical program, it is often necessary or desirable to control functionality of or dynamically alter a user interface element, e.g., to reflect the current state of the program or respond to user input. For example, it may be necessary to change various properties or settings of a user interface element, for example to dim or hide a user interface element that is currently inapplicable, change the size or position of a user interface element, change the data value associated with a user interface element, change the color of a user interface element, etc.

In the prior art, graphical code, i.e., icons or nodes, for affecting user interface elements was included in the main block diagram for the graphical program, e.g., among another nodes in the main block diagram or in a block diagram for a sub-program of the main block diagram. Thus, nodes for controlling functionality of a user interface element were often intermingled with other nodes affecting data flow or control flow of the program. For example, U.S. Pat. No. 5,481,741 titled, "Method and Apparatus for Providing Attribute Nodes in a Graphical Data Flow Environment," discloses a method for incorporating "attribute nodes" in the main block diagram of a graphical program. The attribute nodes can operate to programmatically affect user interface elements. Also, U.S. patent application Ser. No. 09/565,610 now U.S. Pat. No. 6,690,981 titled, "System and Method for Encapsulating User Interface Code for a Graphical Program" discloses a method for placing user interface code in a block diagram for a sub-program of the main block diagram for a graphical program.

One drawback of such techniques is that it may be difficult for the user to mentally separate the user interface portion of the block diagram from other portions of the block diagram. Also, this technique makes it difficult to re-use the portion of the block diagram associated with a user interface element. For example, the user may want to copy a user interface control used in a first graphical program into a second graphical program, such that the graphical code that controls functionality of the user interface control is automatically copied into the second graphical program along with the control. Thus, it would be desirable to provide a system and method enabling a separate block diagram to be associated with a user interface element, wherein this block diagram is separated from the main block diagram of the graphical program. Associating a separate block diagram with a user interface element would promote such well-known programming principles as code modularization and code re-use.

SUMMARY OF THE INVENTION

One embodiment of the present invention comprises a system and method for associating a block diagram with a user interface element. A block diagram associated with a user interface element may include graphical code, i.e., a plurality of interconnected nodes, for controlling functionality of the user interface element. For example, when the user provides user input to a user interface control, the block diagram associated with the control may receive the user input and may respond to the user input. As another example, in response to a user interface indicator receiving data for display, the block diagram associated with the indicator may receive the data and process it, e.g., to control how the data is displayed.

The block diagram associated with the user interface element may control functionality of the user interface element in any way. The block diagram may perform very simple or very complex operations. For example, the block diagram may include a small number of nodes, e.g., one or two, operable to change various user interface characteristics affecting the appearance of the user interface element, e.g., in response to received data. As another example, the block diagram may include a large number of nodes operable to perform complex mathematical operations on data, e.g., to affect the way a stream of data is displayed in a user interface graph indicator.

The user interface element and its associated block diagram may be included in a program. In various embodiments, the program may be either a graphical program having a main block diagram or a text-based program, such as a C, C++, Visual Basic, Java program, or other program not having a block diagram. In the preferred embodiment, the block diagram is associated with the user interface element in such a way that, when the user interface element is copied into or included in the program (or copied from one program into another program), the block diagram is included in the program along with the user interface element. Alternatively, when the user interface element is included in the program, the corresponding block diagram may be associated with the program, but not actually included in the program.

After the user interface element has been included in the program, the program may be executed. Executing the program may comprise executing the block diagram associated with the user interface element in response to certain actions or conditions. For example, as described above, the block diagram may be executed when user input or other data is provided to the user interface element. The block diagram may receive the user input or other data and generate a result based on the received user input or other data. For example, the result may affect the appearance of data displayed by the user interface element, may affect operation of the user interface element, or may affect other characteristics of the user interface element.

As noted above, in one embodiment the user interface element and its associated block diagram may be included in a graphical program. The graphical program may include a main block diagram, and the main block diagram may include one or more subprograms, each having its own block diagram, but the block diagram associated with the user interface element may be separate from these block diagrams. For example, during editing of the graphical program, a block diagram associated with a user interface element may be displayed separately from other block diagrams of the graphical program, e.g., in a separate window.

In one embodiment, the block diagram associated with the user interface element may also be interactively executed without including the user interface element in a program or without executing the program. For example, the user may want to operate a user interface control interactively and independently. Since the functionality of the user interface control is controlled by a separate block diagram, it is possible to execute only this separate block diagram associated with the control in response to user input. Thus, the user may see how the control behaves without needing to execute a program with which the control is associated or even without associating the control with a program at all.

In one embodiment, a block diagram may be associated with a plurality of user interface elements to produce a "compound" user interface element. In other words, the plurality of user interface elements may effectively operate together as a single user interface element, wherein the block diagram ties together the operation of the individual elements. The plurality of user interface elements may each be primitive user interface elements provided by an application development environment, such as buttons, check boxes, graph controls, labels, etc.

The ability to associate a block diagram with a control may not only benefit users by allowing for increased code modularity and reusability, but may also benefit them by increasing the number and types of user interface elements available for use in a program. For example, in one embodiment, an application development environment, e.g., a graphical programming development environment, may be operable to import or use user interface elements having associated block diagrams that are created by third parties.

For example, a third party developer may create a library of specialized user interface elements having associated block diagrams and may provide this library to users. In one embodiment, the application development environment may integrate these custom user interface elements into the environment so that the custom user interface elements may be selected and included in a program just as if they were primitive user interface elements, i.e., those user interface elements natively provided by the environment. For example, the custom user interface elements may be incorporated into a palette or menu.

In one embodiment, the custom user interface elements may be "locked" so that the block diagrams associated with the user interface elements cannot be displayed, or the block diagrams may be password-protected, etc. For example, a third party who creates a custom user interface element may not want to allow users to be able to view the graphical source code (the block diagram) that controls the user interface element's functionality.

BRIEF DESCRIPTION OF THE DRAWINGS

A better understanding of the present invention can be obtained when the following detailed description of the preferred embodiment is considered in conjunction with the following drawings, in which.

Figure 1:
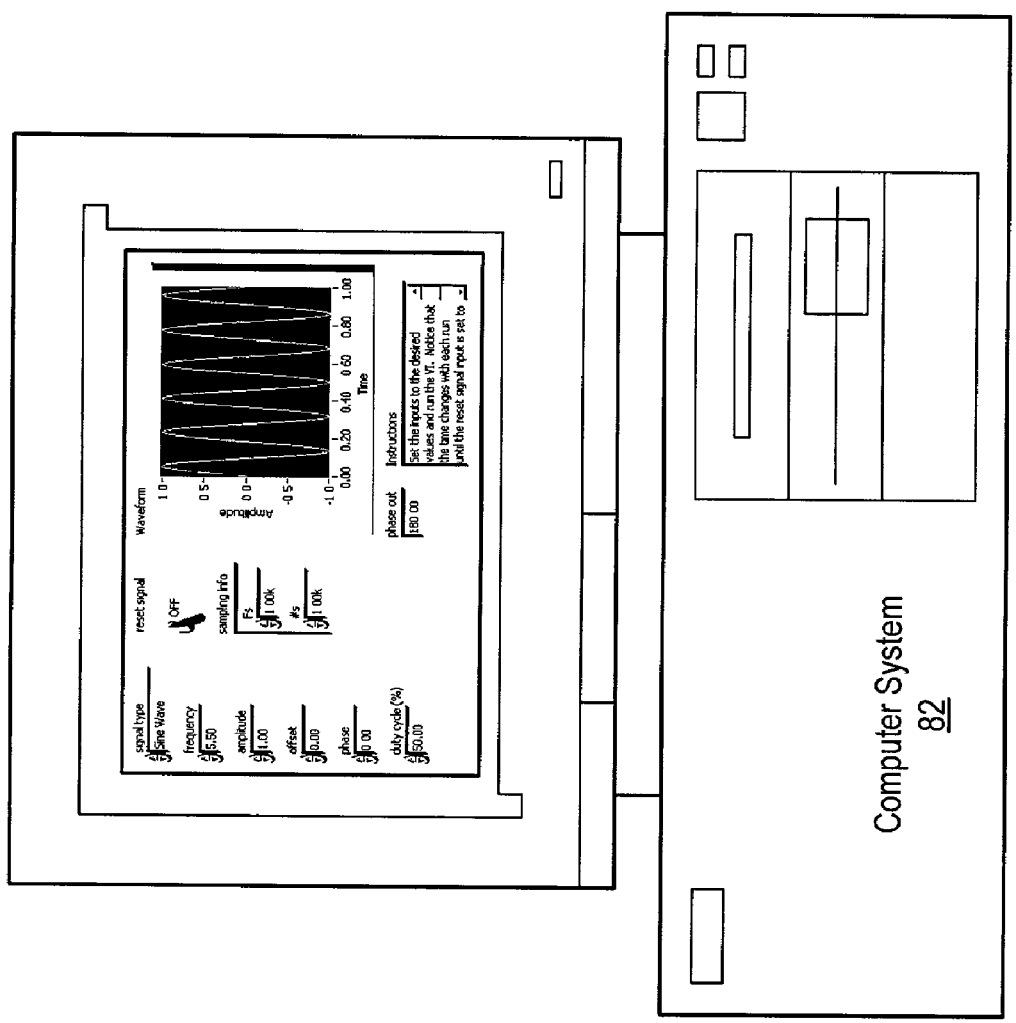
FIG. 1 illustrates a computer system operable to execute a graphical program including one or more user interface elements with associated block diagrams.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. patent application Ser. No. 09/617,600 now U.S. Pat. No. 6,802,053 titled "Graphical Programming System with Distributed Block Diagram Execution and Front Panel Display," filed Jun. 13, 2000.

U.S. patent application Ser. No. 09/745,023 titled "System and Method for Programmatically Generating a Graphical Program in Response to Program Information," filed Dec. 20, 2000.

U.S. patent application Ser. No. 09/565,610 now U.S. Pat. No. 6,690,981 titled "System and Method for Encapsulating User Interface Code for a Graphical Program," filed May 4, 2000.

U.S. patent application Ser. No. 09/737,527 titled, "System and Method for Configuring a GUI Element to Publish or Subscribe to Data," filed Dec. 13, 2000.

The LabVIEW and BridgeVIEW graphical programming manuals, including the "G Programming Reference Manual", available from National Instruments Corporation, are also hereby incorporated by reference in their entirety.

FIG. 1—Computer System

FIG. 1 illustrates a computer system 82 operable to execute a graphical program including one or more user interface elements having associated block diagrams. In the present application, the term "block diagram" is intended to include a diagram comprising graphical code, e.g., two or more interconnected nodes or icons, wherein the interconnected nodes or icons may visually indicate program functionality. The nodes may be connected in one or more of a data flow, control flow, and/or execution flow format. The nodes may also be connected in a "signal flow" format, which is a subset of data flow. A graphical program comprises one or more block diagrams. Thus the term "graphical program" is intended to include a program comprising a plurality of interconnected nodes or icons which visually indicate the functionality of the program.

A graphical program may also comprise a graphical user interface or front panel. The graphical user interface portion of the graphical program may be contained in the block diagram(s) or may be contained in one or more separate panels or windows. The graphical user interface of a graphical program may include various user interface elements or front panel objects, such as user interface controls and/or indicators, and may include other icons which represent devices being controlled. The user interface or front panel may be comprised in a single window of user interface elements, or may comprise a plurality of individual windows each having one or more user interface elements, wherein the individual windows may optionally be tiled together. As another example, the user interface or front panel may comprise user interface or front panel objects, e.g., the GUI, embedded in the block diagram. The user interface of a graphical program may display only output, only input, or both input and output. Further, in some embodiments the user interface or front panel of a graphical program may enable the user to interactively control or manipulate the input being provided to the graphical program.

Examples of graphical program development environments that may be used to create graphical programs include LabVIEW, DasyLab, and DiaDem from National Instruments, VEE from Agilent, WiT from Coreco, Vision Program Manager from PPT Vision, SoftWIRE from Measurement Computing, Simulink from the MathWorks, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others. In the preferred embodiment, the system uses the LabVIEW graphical programming system available from National Instruments.

The computer system 82 of FIG. 1 may be any type of computer system, including a personal computer system, mainframe computer system, workstation, network appliance, Internet appliance, personal digital assistant (PDA), television system, or other device. In general, the term "computer system" can be broadly defined to encompass any device having at least one processor that executes instructions from a memory medium.

As shown in FIG. 1, the computer system 82 may include a display device operable to display the graphical user interface or front panel of the graphical program during execution of the graphical program. The display device may also be operable to display one or more block diagrams of the graphical program as the graphical program is being created and/or executed.

The graphical user interface or front panel may comprise any type of graphical user interface, e.g., depending on the computing platform. In one embodiment, the graphical user interface may comprise one or more windows, such as those used in window-based user interface systems such as provided by the Macintosh Operating System, Microsoft Windows, the X Window System, etc. The graphical user interface may include a plurality of user interface elements, such as user interface controls for receiving user input and/or user interface indicators for displaying output of the graphical program. Examples of user interface controls and indicators include charts, graphs, push buttons, knobs, numeric controls, text boxes, check boxes, list boxes, etc. The graphical user interface may also include any of various other types of user interface elements, such as menu bars, popup context menus, window close buttons, etc.

According to one embodiment of the present invention, one or more of the user interface elements included in a graphical program may have an associated block diagram. One embodiment of a method for associating a block diagram with a user interface element (or with a plurality of user interface elements) is described below. The block diagram(s) associated with the user interface element(s) may be separate block diagrams. For example, the graphical program may include a main block diagram, and the main block diagram may include one or more sub-programs, each having its own block diagram. However, the block diagram(s) associated with the user interface element(s) may be separate from these block diagrams. For example, during editing of the graphical program, a block diagram associated with a user interface element may be displayed separately from other block diagrams of the graphical program, e.g., in a separate window.

A block diagram associated with a user interface element may include graphical code, i.e., a plurality of interconnected nodes, for controlling functionality of the user interface element. For example, when the user provides user input to a user interface control, a block diagram associated with the control may receive the user input and may respond to the user input. The associated block diagram may respond to the user input in any of various ways. As a few examples, the block diagram may cause the control to change the way that it displays data, may operate to dim or hide the control or other user interface elements, may change the color of the control or other user interface elements to indicate an error condition, etc. The associated block diagram may also operate to produce data that is passed on to the main block diagram of the graphical program.

In one embodiment, a block diagram may be associated with a plurality of user interface elements to produce a "compound" user interface element. In other words, the plurality of user interface elements may effectively operate together as a single user interface element, wherein the block diagram ties together the operation of the individual elements. The plurality of user interface elements may each be primitive user interface elements provided by a graphical programming development environment, such as buttons, check boxes, graph controls, labels, etc.

Figure 2:
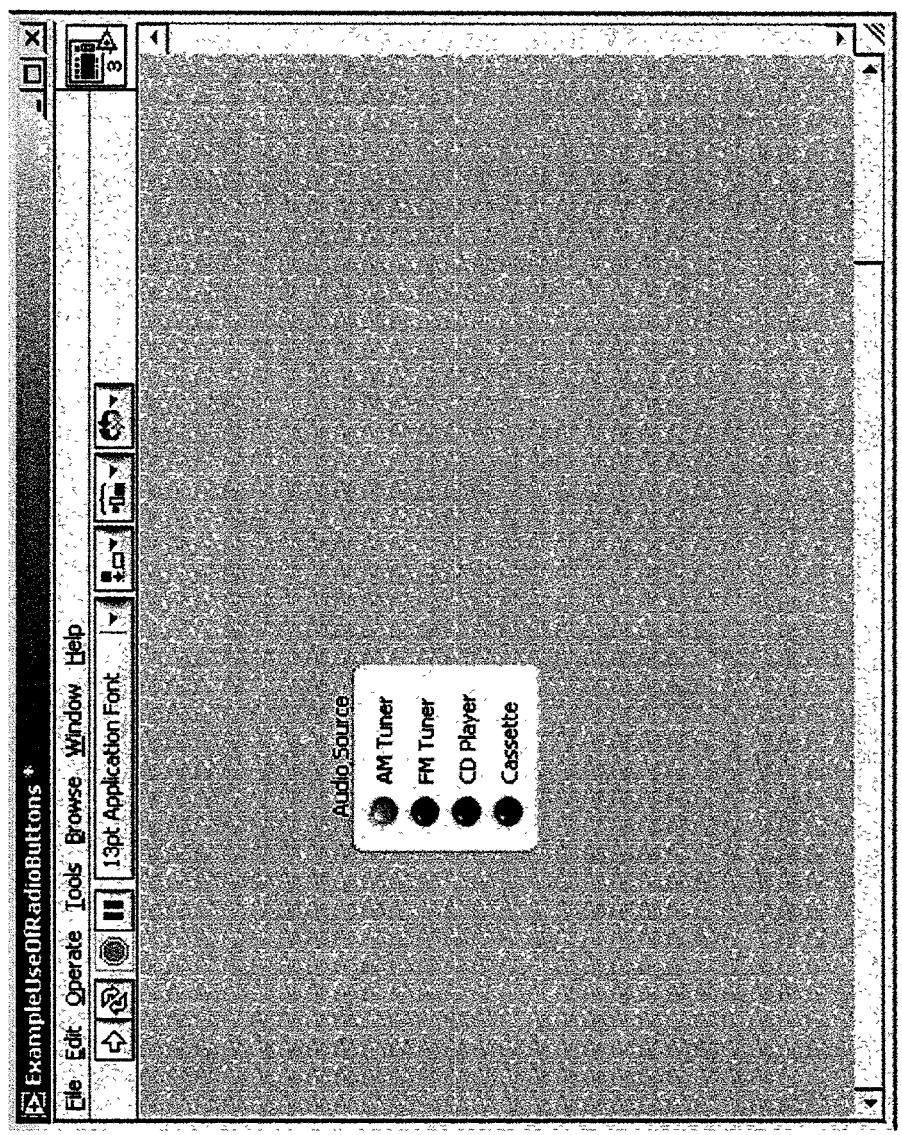
FIG. 2 illustrates a compound user interface control having a plurality of individual user interface elements, wherein a block diagram is associated with the plurality of user interface elements.

As an example of a compound user interface control, consider a software application for receiving audio data from various sources, such as an AM tuner, an FM tuner, a CD player, or a cassette player. It may be desirable to have a "radio button" user interface control allowing the user to select the desired audio source. FIG. 2 illustrates a compound user interface control that implements this radio button functionality. The compound control includes four individual LED user interface indicators displayed on a decoration (the indented rectangular area). The LED indicators and the decoration are primitive user interface elements supported by the graphical programming development environment.

Figure 3A:
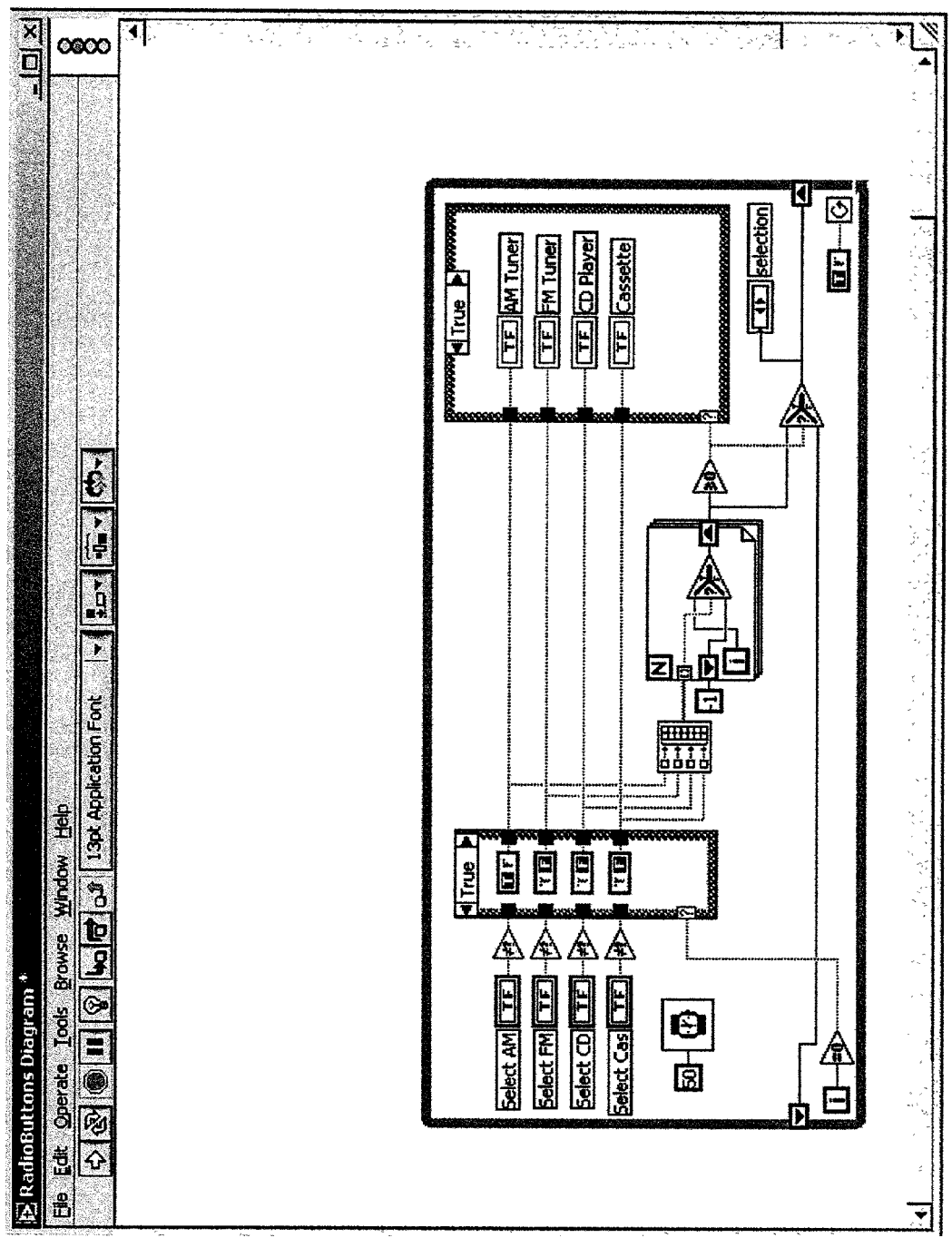
FIG. 3A illustrates the block diagram associated with the plurality of user interface elements in the compound user interface control of FIG. 2.

FIG. 3A illustrates a block diagram associated with the compound control, which ties together the operation of the individual LED indicators. When the user clicks on one of the LED indicators to select the desired audio source, the block diagram receives this user input and operates to light up the LED indicator that the user clicked on and turn off the LED indicator that was lit up previously. (There are actually four transparent buttons positioned over the LED indicators which receive the user clicks and respond by turning the appropriate LED indicators on and off.) The block diagram also outputs a value indicating which LED (i.e., which audio source) the user selected.

FIG. 3A illustrates a simple example of a block diagram associated with a compound control. The block diagram could be enhanced to support other features, such as re-sizing the compound control, e.g., by including graphical code to re-size and move the primitive user interface elements that make up the compound control appropriately in response to a user dragging a corner to re-size.

Figure 3B:
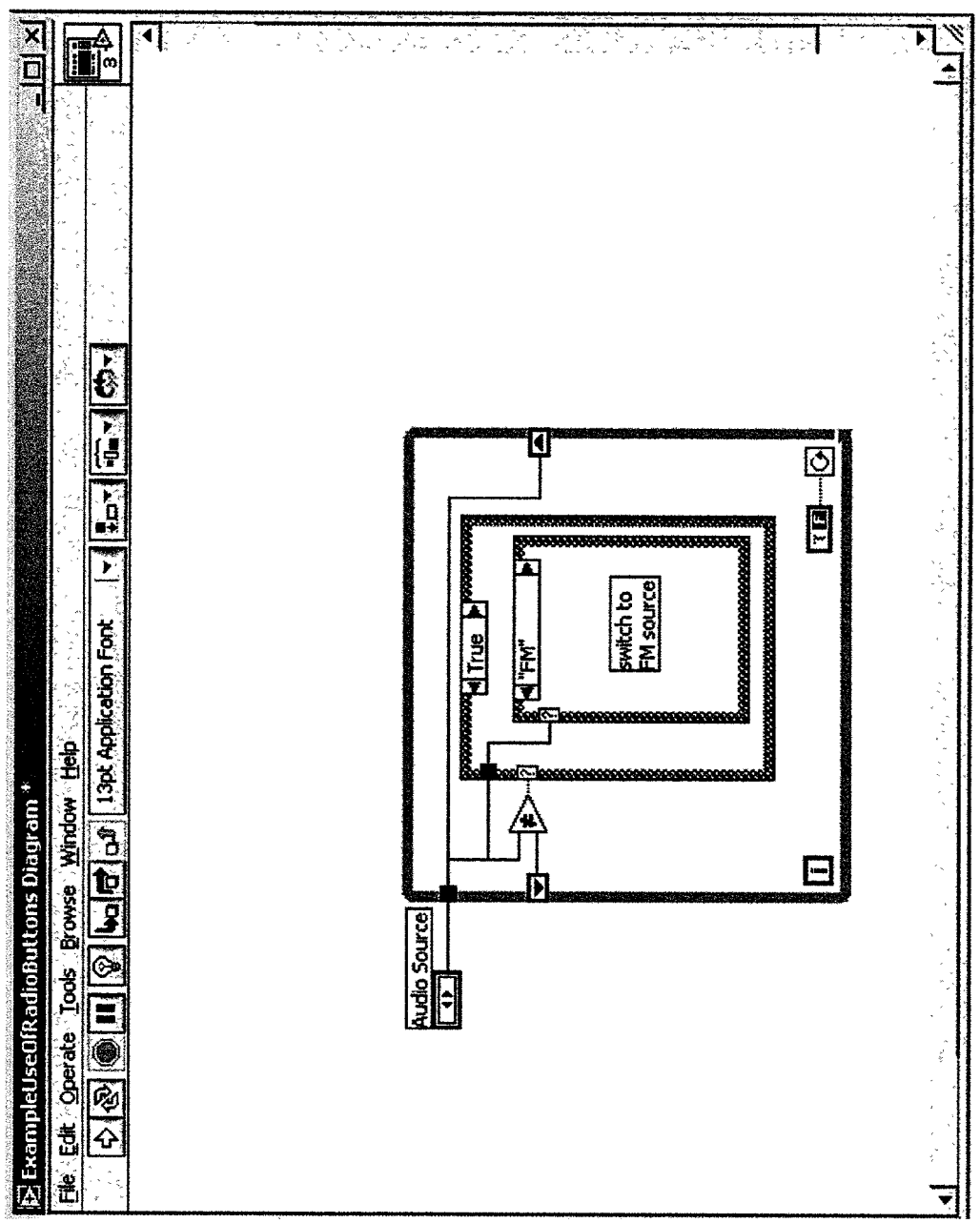
FIG. 3B illustrates a main block diagram for a graphical program that uses the compound user interface control of FIG. 2.

FIG. 3B illustrates a main block diagram for a graphical program that uses the compound user interface control described above. The block diagram includes a case structure that receives the value output by the block diagram associated with the compound user interface control. For each possible value, i.e., each possible audio source, the case structure includes a corresponding sub-diagram. For whichever audio source the user selected, the case structure sub-diagram for that source may include source code for performing whatever operations are necessary for switching to that audio source. (In the illustration, the case structure sub-diagram for the FM source simply includes the label, "switch to FM source", but this is where the actual graphical code for switching to the FM source would be placed.) Thus, when the user selects one of the audio sources by clicking on an LED, the compound control may pass a value to the main block diagram indicating which audio source was selected, and the main block diagram may perform the appropriate switching operation depending on the value received.

Referring again to FIG. 1, the computer system 82 may include a memory medium(s) on which one or more computer programs or software components according to one embodiment of the present invention may be stored. For example, the memory medium may store a graphical programming development application for creating graphical programs. The graphical programming development application may enable a block diagram to be associated with a user interface element. In one embodiment, the graphical programming development application may enable the creation of custom user interface elements that can be included in various types of programs, including text-based programs. For example, the custom user interface elements may be packaged as ActiveX components or other types of software objects or components. In another embodiment, the graphical programming development application may only enable a block diagram to be associated with a user interface element of a graphical program.

The memory medium may also store a user interface element and its associated block diagram. For example, a user interface element with an associated block diagram may be stored in a separate file or as a separate software object or component, which may facilitate the deployment and re-use of the user interface element and its associated block diagram on another computer system. The memory medium may also store one or more graphical programs that use user interface elements having associated block diagrams. The memory medium may also store operating system software, as well as other software for operation of the computer system.

The term "memory medium" is intended to include an installation medium, e.g., a CD-ROM, floppy disks 104, or tape device; a computer system memory or random access memory such as DRAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution.

Figure 4A:
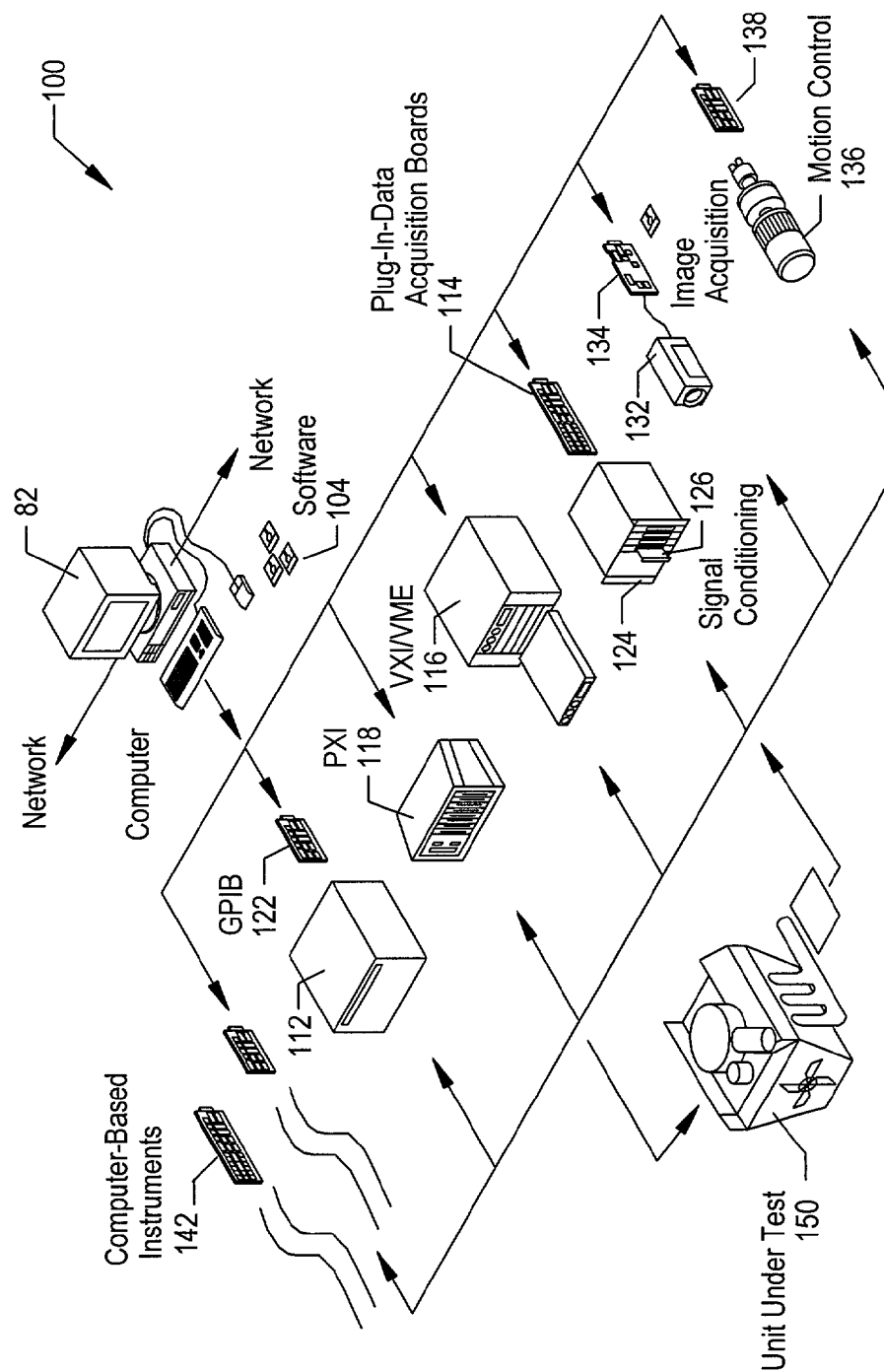
FIGS. 4A and 4B illustrate representative instrumentation and process control systems including various I/O interface options.
Figure 4B:
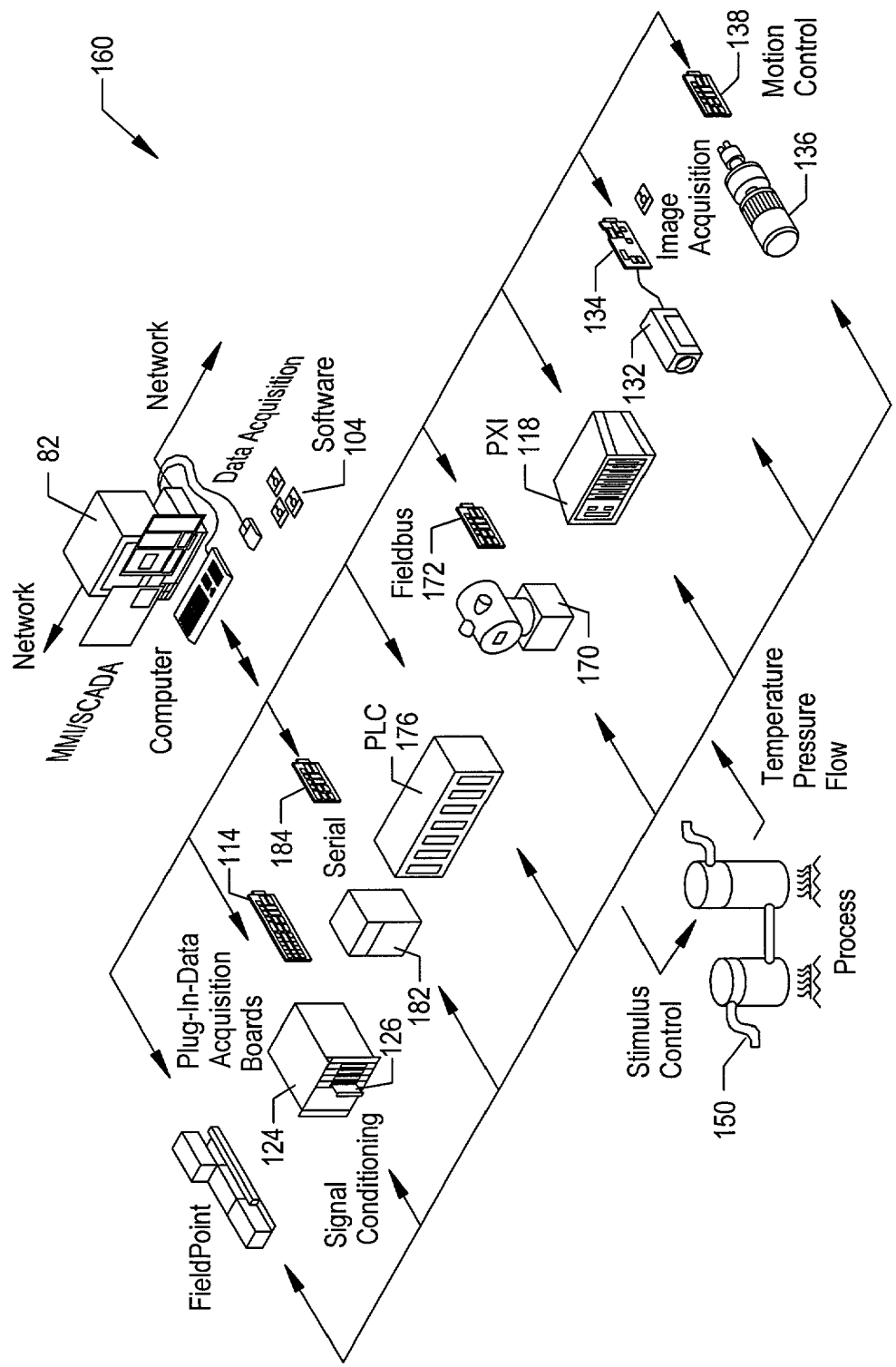

FIGS. 4A and 4B—Instrumentation and Industrial Automation Systems

The following describes embodiments of the present invention involved with performing test and/or measurement functions and/or controlling and/or modeling instrumentation or industrial automation hardware. However, it is noted that the present invention can be used for a plethora of applications and are not limited to instrumentation or industrial automation applications. In other words, the following description is exemplary only, and the present invention may be used in any of various types of systems. Thus, the system and method of the present invention is operable to be used in any of various types of applications, including the control of other types of devices such as multimedia devices, video devices, audio devices, telephony devices, Internet devices, etc., as well as general purpose software applications such as word processing, spreadsheets, network control, games, etc.

FIG. 4A illustrates an exemplary instrumentation control system 100. The system 100 comprises a host computer 82 which connects to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150. For example, the computer 82 may execute a program that includes a user interface element with an associated block diagram, wherein the program interacts with the one or more instruments.

The one or more instruments may include a GPIB instrument 112 and associated GPIB interface card 122, a data acquisition board 114 and associated signal conditioning circuitry 124, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices.

The GPIB instrument 112 may be coupled to the computer 82 via the GPIB interface card 122 provided by the computer 82. In a similar manner, the video device 132 may be coupled to the computer 82 via the image acquisition card 134, and the motion control device 136 may be coupled to the computer 82 through the motion control interface card 138. The data acquisition board 114 may be coupled to the computer 82, and may interface through signal conditioning circuitry 124 to the UUT. The signal conditioning circuitry 124 may comprise an SCXI (Signal Conditioning eXtensions for Instrumentation) chassis comprising one or more SCXI modules 126.

The GPIB card 122, the image acquisition card 134, the motion control interface card 138, and the DAQ card 114 are typically plugged in to an I/O slot in the computer 82, such as a PCI bus slot, a PC Card slot, or an ISA, EISA or MicroChannel bus slot provided by the computer 82. However, these cards 122, 134, 138 and 114 are shown external to computer 82 for illustrative purposes. These devices may also be connected to the computer 82 through a serial bus or through other means.

The VXI chassis or instrument 116 may be coupled to the computer 82 via a VXI bus, MXI bus, or other serial or parallel bus provided by the computer 82. The computer 82 may include VXI interface logic, such as a VXI, MXI or GPIB interface card (not shown), which interfaces to the VXI chassis 116. The PXI chassis or instrument may be coupled to the computer 82 through the computer's PCI bus.

A serial instrument (not shown) may also be coupled to the computer 82 through a serial port, such as an RS-232 port, USB (Universal Ser. bus) or IEEE 1394 or 1394.2 bus, provided by the computer 82. In typical instrumentation control systems an instrument will not be present of each interface type, and in fact many systems may only have one or more instruments of a single interface type, such as only GPIB instruments.

The instruments may be coupled to a unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application.

FIG. 4B illustrates an exemplary industrial automation system 160. The industrial automation system 160 is similar to the instrumentation or test and measurement system 100 shown in FIG. 4A. Elements which are similar or identical to elements in FIG. 4A have the same reference numerals for convenience. The system 160 may comprise a computer 82 which connects to one or more devices or instruments. The computer 82 may comprise a CPU, a display screen, memory, and one or more input devices such as a mouse or keyboard as shown. The computer 82 may operate with the one or more devices to perform an automation function, such as MMI (Man Machine Interface), SCADA (Supervisory Control and Data Acquisition), portable or distributed data acquisition, process control, advanced analysis, or other control. For example, the computer 82 may execute a program that includes a user interface element with an associated block diagram, wherein the program interacts with the one or more devices.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

The DAQ card 114, the PXI chassis 118, the video device 132, and the image acquisition card 134 may be connected to the computer 82 as described above. The serial instrument 182 may be coupled to the computer 82 through a serial interface card 184, or through a serial port, such as an RS-232 port, provided by the computer 82. The PLC 176 may couple to the computer 82 through a serial port, Ethernet port, or a proprietary interface. The fieldbus interface card 172 may be comprised in the computer 82 and may interface through a fieldbus network to one or more fieldbus devices. Each of the DAQ card 114, the serial card 184, the fieldbus card 172, the image acquisition card 134, and the motion control card 138 are typically plugged in to an I/O slot in the computer 82 as described above. However, these cards 114, 184, 172, 134, and 138 are shown external to computer 82 for illustrative purposes. In typical industrial automation systems a device will not be present of each interface type, and in fact many systems may only have one or more devices of a single interface type, such as only PLCs. The devices may be coupled to the device or process 150.

As used herein, the term "instrument" is intended to include any of the devices that are adapted to be connected to a computer system as shown in FIGS. 4A and 4B, traditional "stand-alone" instruments, as well as other types of measurement and control devices. The term "measurement function" may include any type of data acquisition, measurement or control function, such as that implemented by the instruments shown in FIGS. 4A and 4B. For example, the term "measurement function" includes acquisition and/or processing of an image. A graphical program may be created that implements a measurement function. For example, the graphical program may be used to acquire a signal and perform the measurement function on the acquired signal.

Graphical programs that perform data acquisition, analysis and/or presentation, e.g., for measurement, instrumentation control, industrial automation, or simulation, such as in the applications shown in FIGS. 4A and 4B, may be referred to as virtual instruments.

Figure 5:
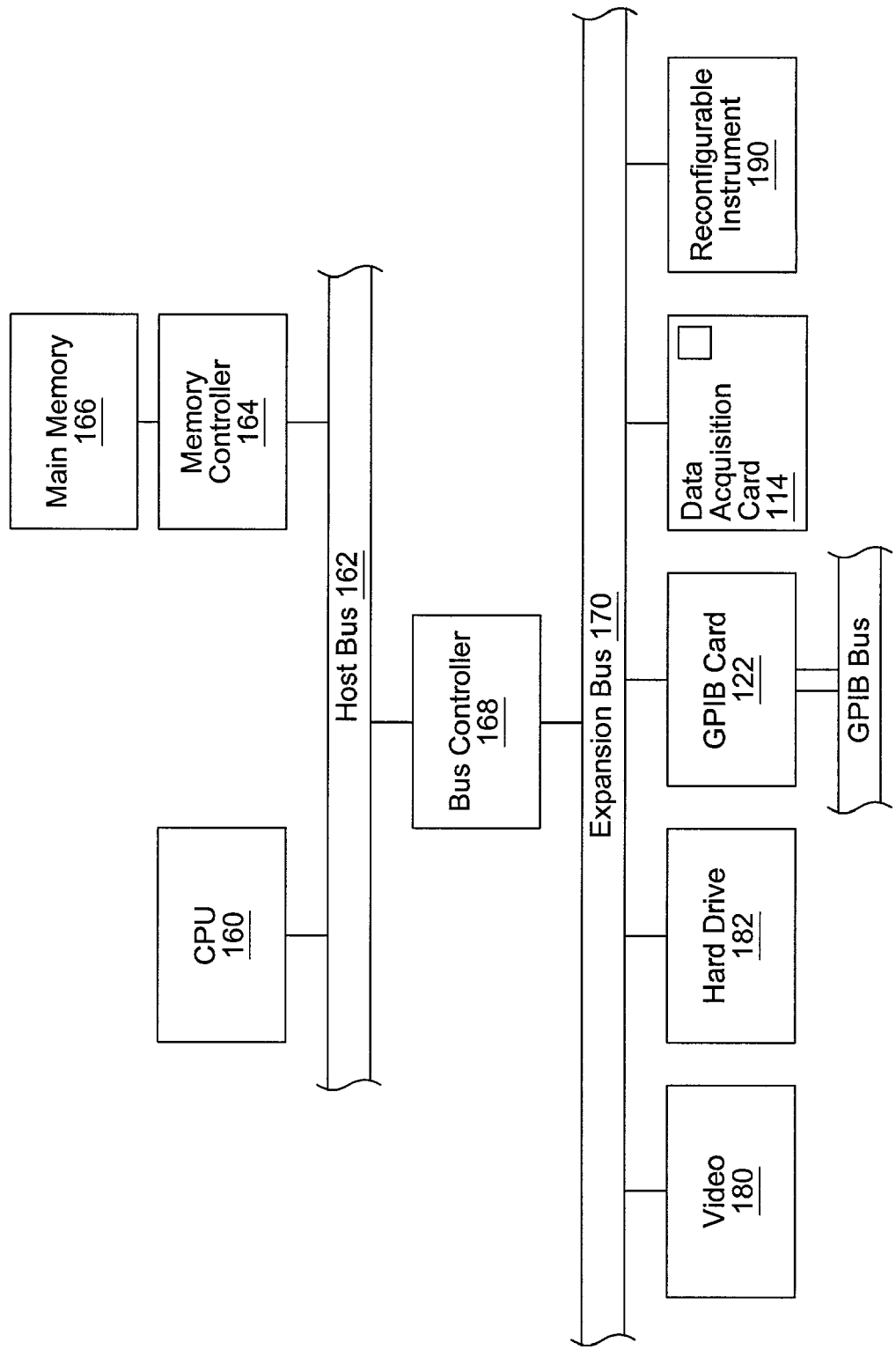
FIG. 5 is an exemplary block diagram of the computer systems of FIGS. 1, 4A, and 4B.

FIG. 5—Computer System Block Diagram

FIG. 5 is a block diagram representing one embodiment of the computer system 82 illustrated in FIGS. 1, 4A or 4B. It is noted that any type of computer system configuration or architecture can be used as desired, and FIG. 5 illustrates a representative PC embodiment. It is also noted that the computer system may be a general purpose computer system, a computer implemented on a VXI card installed in a VXI chassis, a computer implemented on a PXI card installed in a PXI chassis, or other types of embodiments. Elements of a computer not necessary to understand the present description have been omitted for simplicity.

The computer may include at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164. The main memory 166 may store software such as described above with reference to FIG. 1. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as a data acquisition board 114 and a GPIB interface card 122 which provides a GPIB bus interface to a GPIB instrument. The computer 82 further comprises a video display subsystem 180 and hard drive 182 coupled to the expansion bus 170.

As described above, a reconfigurable instrument 190 including configurable logic may also be connected to the computer. In various embodiments, the configurable logic may be comprised on an instrument or device connected to the computer through means other than an expansion slot, e.g., the instrument or device may be connected via an IEEE 1394 bus, USB, or other type of port. Also, the configurable logic may be comprised on a device such as the data acquisition board 114.

Figure 6:
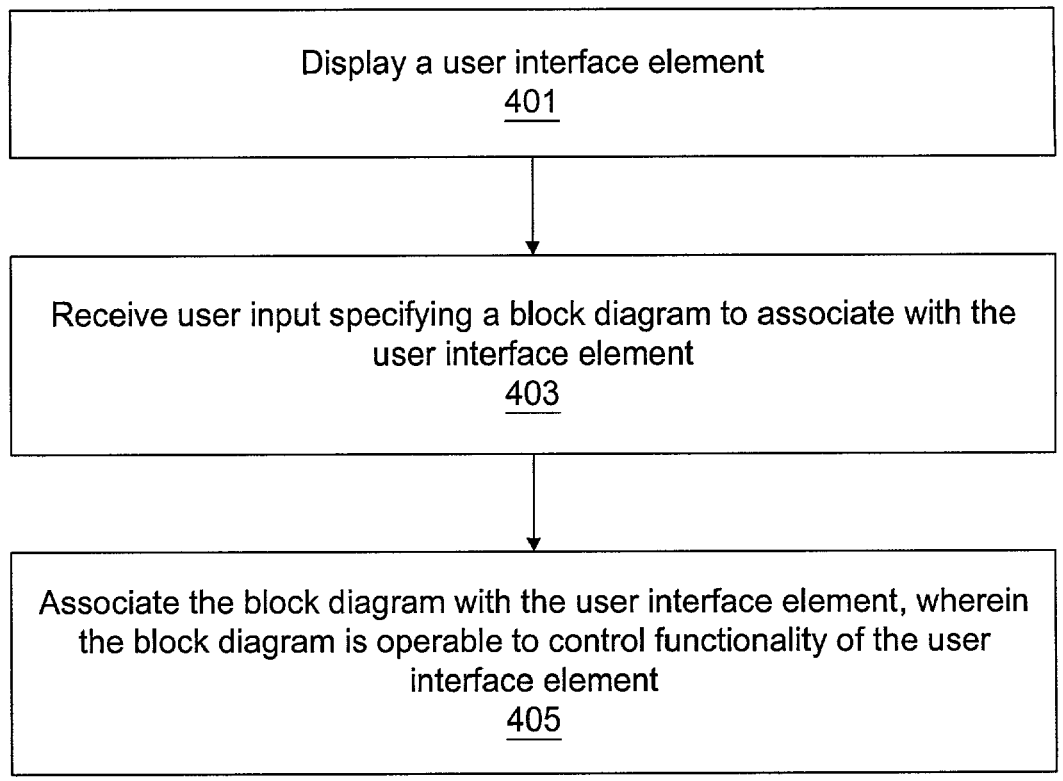
FIG. 6 is a flowchart diagram illustrating one embodiment of a method for associating a block diagram with a user interface element.

FIG. 6—Associating a Block Diagram with a User Interface Element

FIG. 6 is a flowchart diagram illustrating one embodiment of a method for associating a block diagram with a user interface element. It is noted that FIG. 6 represents an exemplary embodiment, and various alternative embodiments are contemplated. Also, the steps of FIG. 6 may be performed in various orders, and steps may be combined, added, or omitted, etc.

In step 401, a user interface element may be displayed. In various embodiments, the user interface element may be displayed in response to any of various causes. For example, in one embodiment, a user may request that the user interface element be included in the graphical user interface of a program, which may be a graphical program or a text-based program. For example, when editing the program, the user may drag and drop the user interface element from a palette onto the graphical user interface of the program or may use menu or keyboard commands to include the user interface element. In another embodiment of step 401, the user interface element may not initially be associated with a program. For example, an application development environment may provide a control editor for editing or specifying attributes of a user interface control or other user interface element. Such a control editor may enable a user to display a user interface element independently of any program, e.g., create a user interface element or to specify a block diagram to associate with the user interface element, as described below.

In step 403, user input specifying a block diagram to associate with the user interface element may be received. In one embodiment, the block diagram may be created or assembled by the user arranging on a display a plurality of nodes or icons and then interconnecting the nodes to create the block diagram. For example, the user may create the block diagram by placing or "dragging and dropping" icons or nodes on the display and interconnecting the nodes in a desired fashion. The nodes may be interconnected in one or more of a data flow, control flow, and/or execution flow format. In response to the user assembling the block diagram, data structures may be created and stored which represent the nodes and interconnections in the diagram. The block diagram may thus comprise a plurality of interconnected nodes or icons that visually indicate the functionality of the block diagram. In one embodiment, the user may specify an existing block diagram to associate with the user interface element instead of creating a new block diagram.

In step 405, the block diagram may be associated with the user interface element in response to the user input specifying the block diagram. The block diagram may be associated with the user interface element in such a way that the block diagram is operable to control functionality of the user interface element. For example, in response to the user providing input to a user interface control such as a button, a block diagram associated with the control may receive the user input and may respond to the user input. As another example, in response to a user interface indicator such as a graph receiving data for display, the block diagram associated with the indicator may receive the data and process it, e.g., to control how the data is displayed.

The block diagram associated with the user interface element may control functionality of the user interface element in any way. The block diagram may perform very simple or very complex operations. For example, the block diagram may include a small number of nodes, e.g., one or two, operable to change various user interface characteristics affecting the appearance of the user interface element. As another example, the block diagram may include a large number of nodes operable to perform complex mathematical operations on data, e.g., to affect the way a stream of data is displayed in a graph indicator.

In the preferred embodiment, the block diagram is associated with the user interface element in such a way that, when the user interface element is copied into or included in a program (or copied from one program into another program), the block diagram is included in the program along with the user interface element. Alternatively, when the user interface element is included in the program, the corresponding block diagram may be associated with the program, but not actually included in the program.

After including the user interface element in a program, the user may modify its associated block diagram if desired. For example, in one embodiment, at edit time the user may click on the user interface element, select a context menu item, or perform other actions to invoke a block diagram editor to modify the associated block diagram.

Where the user interface element is not included in or associated with a particular program, the user interface element and its associated block diagram may be stored in a separate file or as a separate software component or object (e.g., data structures representing the user interface element and its associated block diagram may be stored in a file). Thus the user interface element and its block diagram may be conveniently packaged, facilitating the re-use of the user interface element and its associated block diagram in multiple programs or computer systems. Where the user interface element is included in or associated with a particular program, the user interface element and its block diagram may be stored in a file along with other parts of the program or may be stored in a separate file, where the program is operable to reference the file to use the user interface element.

After the user interface element has been included in a program, the program may be executed. Executing the program may comprise executing the block diagram associated with the user interface element in response to certain actions or conditions. For example, as described above, the block diagram may be executed when user input or other data is provided to the user interface element. As another example, the block diagram associated with the user interface element may be executed when the user moves a cursor on the display over the user interface element.

In one embodiment, the block diagram may also be interactively executed without including the user interface element in a program or without executing the program. For example, the user may want to operate a user interface control interactively and independently. Since the functionality of the user interface control is controlled by a separate block diagram, it is possible to execute only this separate block diagram associated with the control in response to user input. Thus, the user may see how the control behaves without needing to execute a program with which the control is associated or even without associating the control with a program at all.

In one embodiment, the user may select a user interface element and configure the user interface element to subscribe to a data source. This may be performed by the user selecting the user interface element and specifying a uniform resource locator (URL) of the data source. When the data arrives from the data source, the block diagram associated with the user interface element may execute. U.S. patent application Ser. No. 09/737,527 titled, "System and Method for Configuring a GUI Element to Publish or Subscribe to Data" discloses a method for configuring a user interface element to subscribe to a data source.

The ability to associate a block diagram with a control may not only benefit users by allowing for increased code modularity and reusability, but may also benefit them by increasing the number and types of user interface elements available for use in a program. For example, in one embodiment, an application development environment, e.g., a graphical programming development environment, may be operable to import or use user interface elements having associated block diagrams. For example, a third party developer may create a library of specialized user interface elements having associated block diagrams and may provide this library to users. In one embodiment, the application development environment may integrate these custom user interface elements into the environment so that the custom user interface elements may be selected and included in a program just as if they were primitive user interface elements, i.e., those user interface elements natively provided by the environment. For example, the custom user interface elements may be incorporated into a palette or menu.

In one embodiment, the custom user interface elements may be "locked" so that the block diagrams associated with the user interface elements cannot be displayed, or the block diagrams may be password-protected, etc. For example, a third party who creates a custom user interface element may not want to allow users to be able to view the graphical source code that controls the user interface element's functionality.

Figure 7:
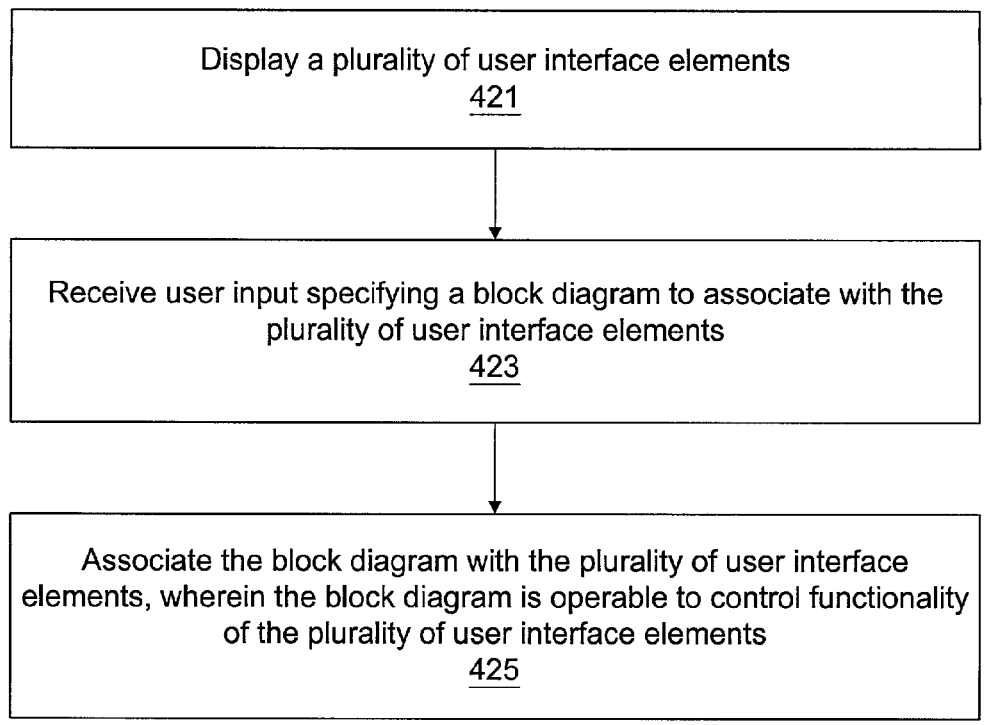
FIG. 7 is a flowchart diagram illustrating one embodiment of a method for associating a block diagram with a plurality of user interface elements.

FIG. 7—Associating a Block Diagram with a Plurality of User Interface Elements

In one embodiment, a block diagram may be associated with a plurality of user interface elements to produce a "compound" user interface element. In other words, the plurality of user interface elements may effectively operate together as a single user interface element, wherein the block diagram ties together the operation of the individual elements. The plurality of user interface elements may each be primitive user interface elements provided by an application development environment, such as buttons, check boxes, graph controls, labels, etc. An example of a compound user interface control is described above with reference to FIGS. 2 and 3.

FIG. 7 is a flowchart diagram illustrating one embodiment of a method for associating a block diagram with a plurality of user interface elements. It is noted that FIG. 7 represents an exemplary embodiment, and various alternative embodiments are contemplated. Also, the steps of FIG. 7 may be performed in various orders, and steps may be combined, added, or omitted, etc.

In step 421, a plurality of user interface elements may be displayed. For example, a plurality of primitive user interface elements provided by an application development environment may be displayed. For example, for the compound user interface element of FIG. 2, step 421 may comprise displaying the individual LED elements. The elements may be displayed in a graphical user interface for a program or in a control editor, similarly as described above. In step 421, the plurality of user interface elements may also be arranged as desired, e.g., may be positioned as desired with respect to each other.

In step 423, user input specifying a block diagram to associate with the plurality of user interface elements may be received. Step 423 may be performed similarly as step 403 described above.

In step 425, the block diagram may be associated with the plurality of user interface elements in response to the user input specifying the block diagram. The block diagram may be associated with the plurality of user interface elements in such a way that the block diagram is operable to control functionality of the plurality of user interface elements.

The plurality of user interface elements may also be associated with each other so that the plurality of individual elements effectively compose a compound user interface element. For example, when the user clicks on an individual element while editing a graphical user interface in which the elements are displayed, all the elements in the plurality of user interface elements may be selected together. For example, the user may then copy the compound user interface element to the clipboard and paste it into a new program, and each of the individual elements may be copied into the new program and displayed in the same way as the original elements. The block diagram associated with the elements may also be copied into the new program.

By enabling a block diagram to be associated with a plurality of user interface elements, not only can the functionality of user interface elements be extended or changed, but entirely new kinds of user interface elements can be created. The audio source compound control of FIGS. 2 and 3 is one example. Another example is a compound graph control. Most user interface graph controls have a single Y-axis. It may be desirable to have a graph control with 2 Y-axes, e.g., to plot two sets of data values, wherein the values in the two sets have an order of magnitude difference. The method of FIG. 7 may allow a compound graph control including two Y-axes to be created, wherein the plurality of user interface elements of the compound graph control comprises two Y-axis user interface elements, along with other user interface elements, such as the display portion of the graph. The block diagram associated with the compound graph control may include graphical source code for appropriately scaling and displaying the two data sets on the display portion of the compound graph control.

Figure 8:
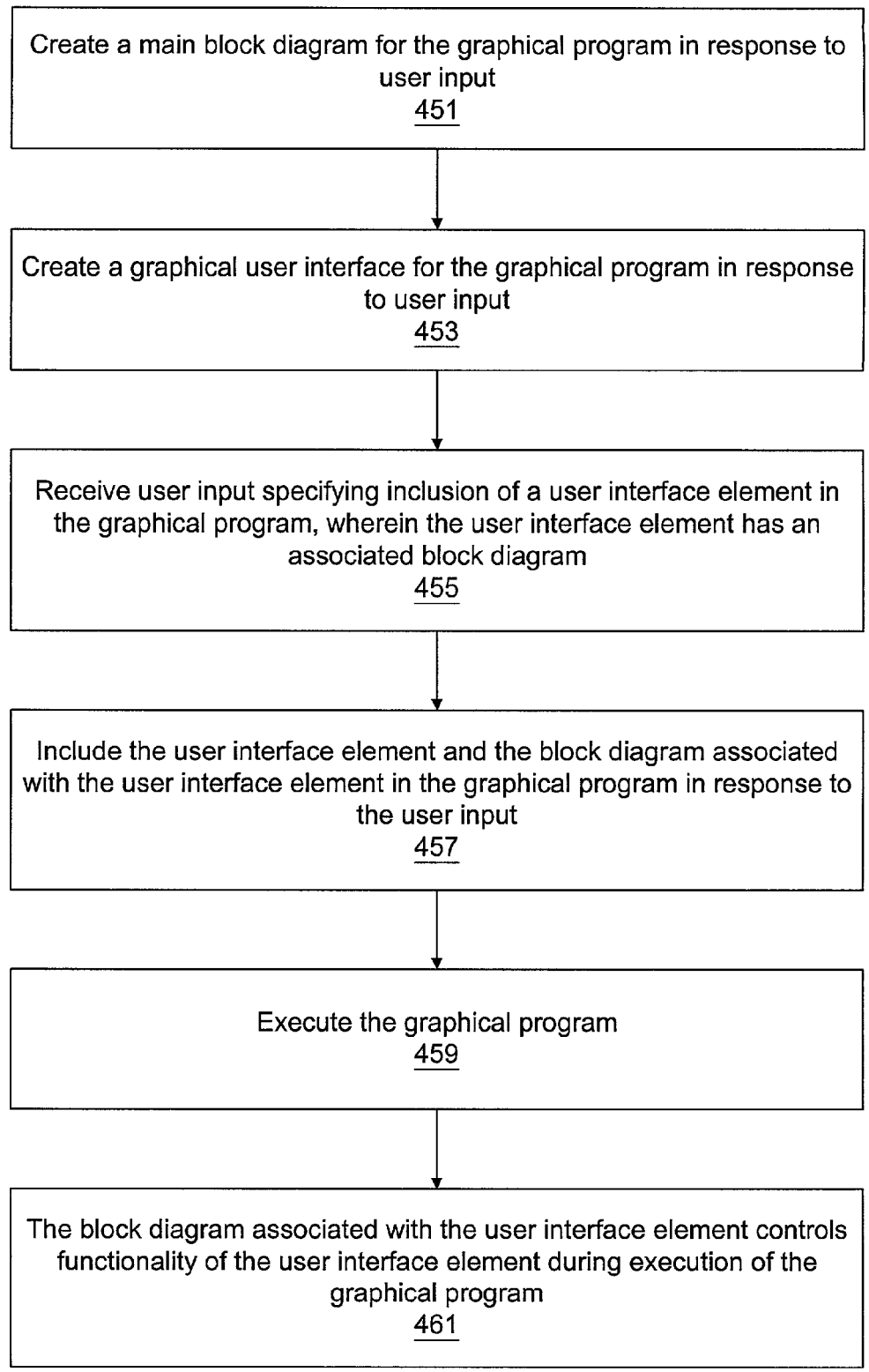
FIG. 8 is a flowchart diagram illustrating one embodiment of a method for creating a graphical program, wherein the graphical program utilizes a user interface element having an associated block diagram.

FIG. 8—Creating a Graphical Program

In various embodiments, user interface elements having associated block diagrams may be used in any of various types of programs, wherein the programs have any of various types of graphical user interfaces. In one embodiment, a user interface element having an associated block diagram may be used in a graphical program. FIG. 8 is a flowchart diagram illustrating one embodiment of a method for creating a graphical program, wherein the graphical program utilizes a user interface element having an associated block diagram. It is noted that FIG. 8 represents an exemplary embodiment, and various alternative embodiments are contemplated. Also, the steps of FIG. 8 may be performed in various orders, and steps may be combined, added, or omitted, etc.

In step 451, a main block diagram for the graphical program may be created. The main block diagram may comprise a plurality of interconnected nodes visually indicating functionality of the program.

In step 453, a graphical user interface or front panel for the graphical program may be created. The graphical user interface or front panel may comprise one or more user interface elements, such as buttons, check boxes, menu bars, list boxes, etc.

In step 455, user input specifying inclusion of a first user interface element in the graphical program may be received, wherein the first user interface element has an associated block diagram. For example, the block diagram may have been associated with the first user interface element as described above with reference to the method of FIG. 6.

In step 457, the first user interface element and the block diagram associated with the first user interface element may be included in the graphical program in response to the user input. Including the first user interface element in the graphical program may comprise including the first user interface element in the graphical user interface or front panel of the graphical program. In a graphical program, the graphical user interface and the main block diagram may be kept separate or together. In one embodiment, the first user interface element may be included in a separate graphical user interface window or panel, and in response a terminal corresponding to the first user interface element may appear in the main block diagram. For example, the corresponding terminal may appear in the main block diagram as a node that may be connected to other nodes in the main block diagram, e.g., to provide input to and/or display output from other nodes in the main block diagram. In another embodiment, the first user interface element may be comprised in or embedded in the main block diagram, along with other nodes.

The block diagram associated with the first user interface element may be included in the graphical program in any of various ways. For example, the associated block diagram may not initially be displayed, but the user may request to display the block diagram, e.g., by clicking or double-clicking on the first user interface element, issuing a context menu command from the first user interface element, issuing a context menu command from a terminal in the main block diagram corresponding to the user interface element, or in other ways. The block diagram may then be displayed, e.g., in a separate window. In one embodiment, when the first user interface element and the block diagram associated with the first user interface element are included in the graphical program, an icon or other indication may be included in the main block diagram of the graphical program in response, to inform the user that the graphical program includes additional source code that is not displayed on the main block diagram. In step 459, the graphical program may be executed.

In step 461, the block diagram associated with the first user interface element may control functionality of first the user interface element during execution of the graphical program, as described above. The block diagram may control functionality of first the user interface element in any of various ways. For example, the block diagram may operate to change various user interface characteristics of the first user interface element. For example, the user interface element may be dimmed or hidden, the size or position of the user interface element may be changed, a color of the user interface element may be changed, etc. Also, a data value associated with the user interface element may be changed, or the way the user interface element displays the data may be changed.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A computer-implemented method for creating a graphical program, the method comprising:

receiving user input requesting inclusion of a user interface element in the graphical program, wherein the user interface element has a block diagram associated with the user interface element before said receiving the user input, wherein the user interface element has an appearance that is separate from any data displayed in the user interface element; and including the user interface element in the graphical program in response to the user input, wherein said including the user interface element in the graphical program comprises automatically including the block diagram associated with the user interface element in the graphical program;

wherein, during execution of the graphical program, the block diagram associated with the user interface element is operable to change characteristics affecting the appearance of the user interface element.

2. The method of claim 1, wherein said receiving user input requesting inclusion of the user interface element in the graphical program comprises receiving user input selecting the user interface element from a plurality of user interface elements.

3. The method of claim 1,
wherein the graphical program includes a main block diagram, wherein the main block diagram is separate from the block diagram associated with the user interface element.

4. The method of claim 1, further comprising:
displaying the block diagram associated with the user interface element after said including the user interface element in the graphical program.

5. The method of claim 4,
wherein said displaying the block diagram associated with the user interface element comprises automatically displaying the block diagram associated with the user interface element in response to said including the user interface element in the graphical program.

6. The method of claim 4, further comprising:
receiving user input requesting to display the block diagram associated with the user interface element after said including the user interface element in the graphical program;
wherein said displaying the block diagram associated with the user interface element comprises displaying the block diagram associated with the user interface element in response to the user input requesting to display the block diagram associated with the user interface element.

7. The method of claim 1,
wherein the block diagram associated with the user interface element is locked so that the block diagram associated with the user interface element is not displayable from the graphical program.

8. The method of claim 1,
wherein said changing characteristics affecting the appearance of the user interface element comprises changing a manner in which data is displayed in the user interface element.

9. The method of claim 1,
wherein a main block diagram of the graphical program is operable to provide data to the user interface element during execution of the graphical program;
wherein the block diagram associated with the user interface element is operable to receive the data from the main block diagram and process the data.

10. The method of claim 1,
wherein a main block diagram of the graphical program is operable to provide data to the user interface element during execution of the graphical program;
wherein the block diagram associated with the user interface element is operable to receive the data from the main block diagram and control a visual appearance of the user interface element based on the data.

11. The method of claim 1,
wherein the block diagram associated with the user interface element is operable to receive user input to the user interface element during execution of the graphical program and process the user input.

12. The method of claim 1, further comprising:
displaying a palette of user interface elements;
wherein said receiving user input requesting inclusion of the user interface element in the graphical program comprises receiving user input selecting the user interface element from the palette of user interface elements.

13. The method of claim 1,
wherein the user interface element comprises one of:
a user interface control; or
a user interface indicator.

14. The method of claim 1,
wherein the block diagram associated with the user interface element comprises a plurality of interconnected nodes that visually indicate functionality of the user interface element.

15. The method of claim 1,
wherein the block diagram associated with the user interface element comprises a graphical data flow diagram.

16. The method of claim 1, further comprising:
executing the graphical program; and
the block diagram associated with the user interface element executing to control the functionality of the user interface element during execution of the graphical program.

17. A computer-implemented method for creating a graphical program, the method comprising:
receiving user input requesting inclusion of a user interface element in the graphical program, wherein the user interface element has a first block diagram associated with the user interface element before said receiving the user input, wherein the user interface element has an appearance that is separate from any data displayed in the user interface element; and
including the user interface element in the graphical program in response to the user input, wherein said including the user interface element in the graphical program comprises automatically associating the first block diagram with the graphical program;
wherein, during execution of the graphical program, the first block diagram associated with the user interface element is operable to change characteristics affecting the appearance of the user interface element.

18. A computer-readable memory medium for creating a graphical program, the memory medium comprising program instructions executable to:
receive user input requesting inclusion of a user interface element in the graphical program, wherein the user interface element has a block diagram associated with the user interface element before said receiving the user input, wherein the user interface element has an appearance that is separate from any data displayed in the user interface element; and
include the user interface element in the graphical program in response to the user input, wherein said including the user interface element in the graphical program comprises automatically including the block diagram associated with the user interface element in the graphical program;
wherein, during execution of the graphical program, the block diagram associated with the user interface element is operable to change characteristics affecting the appearance of the user interface element.

19. A computer-implemented method for associating a first block diagram with a user interface element, the method comprising:
displaying the user interface element, wherein the user interface element has an appearance that is separate from any data displayed in the user interface element;
receiving user input specifying the first block diagram to associate with the user interface element, wherein the first block diagram includes a plurality of nodes visually indicating functionality of the user interface element; and associating the first block diagram with the user interface element, wherein the first block diagram is operable to change characteristics affecting the appearance of the user interface element;

wherein after said associating the first block diagram with the user interface element, the user interface element is selectable for inclusion in a graphical program such that the first block diagram associated with the user interface element is executed during execution of the graphical program in response to including the user interface element in the graphical program.

20. The method of claim 19, further comprising:

receiving user input requesting inclusion of the user interface element in a first graphical program, after said associating the first block diagram with the user interface element; and including the user interface element in the first graphical program in response to the user input requesting inclusion of the user interface element in the first graphical program, wherein said including the user interface element in the first graphical program comprises automatically including the first block diagram associated with the user interface element in the first graphical program;

wherein, during execution of the first graphical program, the first block diagram associated with the user interface element is operable to change characteristics affecting the appearance of the user interface element.

21. The method of claim 19, further comprising:

storing the user interface element and the first block diagram associated with the user interface element as a component available for inclusion in multiple graphical programs.

22. The method of claim 19, wherein said changing characteristics affecting the appearance of the user interface element comprises changing a manner in which data is displayed in the user interface element.

23. The method of claim 19, wherein said changing characteristics affecting the appearance of the user interface element comprises processing data received as input to the user interface element.

24. The method of claim 19, wherein the user interface element comprises one of:
a user interface control; or
a user interface indicator.

25. The method of claim 19, wherein the first block diagram associated with the user interface element comprises a graphical data flow diagram.

26. The method of claim 19, wherein said receiving user input specifying the first block diagram to associate with the user interface element comprises:

arranging the plurality of nodes on a display; and
interconnecting the plurality of nodes in response to user input.

27. A computer-readable memory medium for associating a first block diagram with a user interface element, the memory medium comprising program instructions executable to:

display the user interface element, wherein the user interface element has an appearance that is separate from any data displayed in the user interface element;

receive user input specifying the first block diagram to associate with the user interface element, wherein the first block diagram includes a plurality of nodes visually indicating functionality of the user interface element; and associate the first block diagram with the user interface element wherein the first block diagram is operable to change characteristics affecting the appearance of the user interface element;

wherein after said associating the first block diagram with, the user interface element, the user interface element is selectable for inclusion in a graphical program such that the first block diagram associated with the user interface element is executed during execution of the graphical program in response to including the user interface element in the graphical program.

* * * * *